United States Patent [19]
Cohen et al.

[11] Patent Number: 5,581,655
[45] Date of Patent: Dec. 3, 1996

[54] METHOD FOR RECOGNIZING SPEECH USING LINGUISTICALLY-MOTIVATED HIDDEN MARKOV MODELS

[75] Inventors: Michael H. Cohen, East Palo Alto; Mitchel Weintraub, Fremont; Patti J. Price, Palo Alto; Hy Murveit, Redwood City; Jared C. Bernstein, Menlo Park, all of Calif.

[73] Assignee: SRI International, Menlo Park, Calif.

[21] Appl. No.: 589,432

[22] Filed: Jan. 22, 1996

Related U.S. Application Data

[60] Continuation of Ser. No. 71,801, Jun. 1, 1993, which is a division of Ser. No. 648,097, Jan. 21, 1991, Pat. No. 5,268,990.

[51] Int. Cl.⁶ ..................................................... G10L 5/06
[52] U.S. Cl. .......................................... 395/2.54; 395/2.65
[58] Field of Search ............................ 381/41–43; 395/2, 395/2.49, 2.54, 2.63, 2.65, 2.66

[56] References Cited

U.S. PATENT DOCUMENTS

| | | | |
|---|---|---|---|
| 4,903,305 | 2/1990 | Gillick et al. | 395/2.54 |
| 4,975,959 | 12/1990 | Benbassat | 395/2.49 |
| 5,033,087 | 7/1991 | Bahl et al. | 395/2.54 |
| 5,268,990 | 12/1993 | Cohen et al. | 395/2 |

OTHER PUBLICATIONS

Flanagan, "Speech Analysis, Synthesis and Perception," New York, Academic Press Inc., 1965, p. 14.

Bourlard et al., "Speaker Dependent Connected Speech Recognition via Phonemic Markov Models", ICASSP 85, 26–29 Mar. 1985, Tampa, FL, pp. 1213–1216.

*Primary Examiner*—David D. Knepper
*Attorney, Agent, or Firm*—Townsend and Townsend and Crew, LLP

[57] ABSTRACT

An automatic speech recognition methodology, wherein words are modeled as probabilistic networks of allophones, collects nodes in the probabilistic network into equivalence classes when those nodes have the same allophonic choices governed by the same phonological rules. The allophonic choices allow for representation of dialectic pronunciation variations between different speakers. Training data is shared among nodes in an equivalence class so that accurate pronunciation probabilities may be determined even for words for which there is only a limited amount of training data. A method is used to determine probabilities for each of a multitude of pronunciation models for each word in the vocabulary, based on automatic extraction of linguistic knowledge from sets of phonological rules, in order to robustly and accurately model dialectal variation.

7 Claims, 4 Drawing Sheets

Microfiche Appendix Included
(2 Microfiche, 128 Pages)

$$+ \longrightarrow dx \: / - V$$
$$\{-stress\}$$

METHOD FOR RECOGNIZING SPEECH USING LINGUISTICALLY-MOTIVATED HIDDEN MARKOV MODELS

ACKNOWLEDGEMENT OF SPONSORSHIP

This invention was partially funded under grants from the National Science Foundation (NSF EE-8517751) and the United States Navy (Contract No. N-00039-85-C-0302), in addition to funding from SRI International of Menlo Park, Calif.

This application is a file-wrapper-continuation of application Ser. No. 08/071,801 filed Jun. 1, 1993 which is a division of application Ser. No. 07/648,097, now U.S. Pat. No. 5,268,990 filed Jan. 21, 1991.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

Microfiche Appendices

This application includes microfiche appendices of source code for a preferred embodiment, consisting of 2 sheets with a total of 128 pages.

This invention relates to speech recognition and more particularly to the types of such systems based on hidden Markov models.

Automatic speech recognition is a very difficult problem. For many applications, it is necessary to recognize speech in a speaker-independent manner (i.e., handle new speakers with no speaker-specific training of the system). This has proven to be difficult due to differences in pronunciation from speaker to speaker. Even speaker-dependent recognition has proven to be difficult due to variations in pronunciation in the speech of an individual.

Various hidden Markov model based speech recognition systems are known and need not be detailed herein. Such systems typically use realizations of phonemes which are statistical models of phonetic segments (including allophones or more generically phones) having parameters that are estimated from a set of training examples.

Models of words are made by concatenating the appropriate phone models. Recognition consists of finding the most-likely path through the set of word models for the input speech signal.

Known hidden Markov model speech recognition systems are based on a model of speech production as a Markov source. The speech units being modeled are represented by finite state machines. Probability distributions are associated with the transitions leaving each node, specifying the probability of taking each transition when visiting the node. A probability distribution over output symbols is associated with each node. The transition probability distributions implicitly model duration. The output symbol distributions are typically used to model speech characteristics such as spectra.

The probability distributions for transitions and output symbols are estimated using labeled examples of speech. Recognition consists of determining the path through the Markov chain that has the highest probability of generating the observed sequence. For continuous speech, this path will correspond to a sequence of word models. As background to this technology, reference is made to Rabiner, "A Tutorial on Hidden Markov Models and Selected Applications in Speech Recognition, " *Proc. IEEE*, Vol. 77, No. 2, Feb. 1989, the content of which is incorporated herein by reference. Other published references are cited hereinafter, the content of which is incorporate herein by reference to the extent needed to satisfy disclosure requirements. All material incorporated herein by reference from non-U.S.-patent documents is incorporated as background material only and is not essential material to an understanding of the invention.

Standard training and recognition algorithms for hidden Markov models are described in J. K. Baker, "Stochastic Modeling as a Means of Automatic Speech Recognition," PhD Thesis Carnegie-Mellon University Computer Science Department, April 1975, or in Levinson et al., "An Introduction to the Application of the Theory of Probabilistic Functions on a Markov Process to Automatic Speech Recognition," *Bell Sys. Tech. Journal*, vol. 62(4). April 1983.

A number of systems have been developed which use allophone network representations of alternative pronunciations of words, such as Bahl, L. R. et al., "Further Results on the Recognition of a Continuously Read Natural Corpus," *IEEE International Conference on Acoustics, Speech and Signal Processing*, pp. 872–875, April 1980, and Cohen et al., "The Phonological Component of an Automatic Speech Recognition System," in *Speech Recognition*, R. Reddy, ed., Academic Press, New York, pp. 275–320. These networks typically are generated by the application of phonological rules to a set of baseforms, or standard or common pronunciations of words. A number of different phonological rule sets have been developed for use in speech recognition systems, such as Cohen et al., "The Phonological Component of an Automatic Speech Recognition System," in *Speech Recognition*, R. Reddy, ed., Academic Press, New York, pp. 275–320. Further, a number of different software systems have been developed to aid in the construction of phonological rule sets, such as Cohen et al., "The Phonological Component of an Automatic Speech Recognition System," in *Speech Recognition*, R. Reddy, ed., Academic Press, New York, pp. 275–320. These systems provide a means of specifying phonological rules and applying them to a dictionary of baseforms to create a representation of surface form pronunciations.

The major advantage of modeling alternative pronunciations with phone networks is that they explicitly represent linguistic knowledge about pronunciation. For hidden Markov model systems, this explicit representation of alternative pronunciations avoids the problem of averaging together different phenomena into the same model, resulting in a less precise model. Substitution, insertion, deletion, and changes in the order of phones can be explicitly modeled.

Phonological rules can be written to cover dialectal variation, fast speech reductions, etc. Generating these networks using rules and a baseform dictionary allows new vocabulary items to be added by composing or writing the appropriate baseform and allowing the alternative pronunciations to be derived automatically. Using rules and baseforms allows the expression of phonological knowledge in a form that linguists have used extensively in the past, and as such it seems to be a convenient notation for the expression of many general segmental phonological processes. Networks can be a compact representation of many alternative pronunciations.

In previous approaches using phone network representations of multiple pronunciations, rule sets have been developed without rigorous measures of what rules would be most important to the handling of the speech expected as input to a system and without a principled approach to refining the contextual specifications of rules in order to avoid overgeneration of pronunciations.

In previous approaches, the probabilities of the different pronunciations modeled have not been used because they are hard to estimate for a large vocabulary system, since most words in the vocabulary will not occur frequently enough in the training data to obtain accurate estimates. This can lead to new false alarms during recognition, especially in continuous speech recognition systems.

There is substantial structure to phonological and phonetic variation within and across speakers, and there exists a large scientific literature dealing with linguistic structure at these and other levels. In the PhD dissertation of one of the co-inventors (M. H. Cohen, *Phonological Structures for Speech Recognition*, University of California, Berkeley, completed April 1989, publication first available February 1990), the literature is reviewed, the significant structure to phonological variation is demonstrated, and methods are taught for using the structure. With the exception of this dissertation, there has been not been a teaching of how knowledge of this structure can be exploited to advantage in prior hidden Markov model (HMM) based speech recognition systems. It is a goal of the current invention to explicitly model certain aspects of phonetic and phonological structure in order to improve the performance of HMM systems and to extend the work undertaken in the course of the dissertation.

There are a number of significant limitations of current HMM systems which are in need of solution. Prior systems which model multiple pronunciations of words typically generate those models either by direct specification by an expert, or through the application of a set of phonological rules to baseform pronunciations of the words. The phonological rule sets have generally been developed without rigorous measures of what rules would be most important to handle the speech expected as input to a system. It is difficult to write rules which generate exactly those pronunciations that happen without ever generating pronunciations that do not happen. When writing many rules, in order to cover many of the pronunciations that do happen, the size of the representation can become prohibitively large, requiring much larger training data sets than are currently available in order to estimate the large number of parameters. In other words, the modeling techniques of past recognition systems have resulted in "bushy" networks, i.e., networks with many optional paths representing many possible pronunciations of each word, which causes problems in the statistically-based HMM systems.

Prior systems which model multiple pronunciations of words also typically do not use appropriate estimates of the probabilities of the various pronunciations modeled, since current training databases contain too few occurrences of all but the most common words to estimate probabilities reliably. This leads to false alarms due to the fact that pronunciations which are, in fact, unlikely, are represented as being as likely as other, more common pronunciations.

The pronunciation of words is affected by the surrounding words. In particular, the realization of word-initial and word-final phones may vary substantially, depending on the adjacent phones in neighboring words. These cross-word effects are not explicitly modeled in current HMM systems, thereby degrading recognition performance.

Moreover, prior systems which model only a single pronunciation of each word typically do not choose the best single pronunciation to use based on a large set of training data. This often leads to a poor choice of pronunciation model, which is likely to lead to recognition errors.

It is therefore desirable to provide a method for use in a continuous speech recognition system which facilitates the recognition of phones in context with surrounding phones.

SUMMARY OF THE INVENTION

According to the invention, automatic speech recognition accuracy in a hidden Markov model based system is improved by taking advantage of linguistic constraints wherein words are modeled as probabilistic networks of phonetic segments (herein phones), and each phone is represented as a context-independent hidden Markov-phone model mixed with a number of context-dependent phone models. Recognition is based on use of methods to design phonological rule sets based on measures of coverage and overgeneration of pronunciations which achieves high coverage of pronunciations with compact representations. Further, a method estimates probabilities of the different possible pronunciations of words. A further method models cross-word coarticulatory effects. In a specific embodiment of the system, a specific method determines the single most-likely pronunciation of words. In further specific embodiments of the system, methods generate speaker-dependent pronunciation networks.

The invention will be better understood by reference to the following detailed description in connection with the accompanying drawings.

DESCRIPTION OF THE PREFERRED EMBODIMENT

Hidden Markov model (HMM) speech recognition systems are based on a model of speech production as a Markov source. The speech units being modeled may be represented by finite state machines. Each phone in the system may be represented by a three-state directed network. Associated with each transition between states is a probability of taking that transition when visiting its source node. A probability distribution over output symbols is associated with each node. (The output probability distributions model features of speech, and the transition probability distributions implicitly model duration.)

Figure 1:
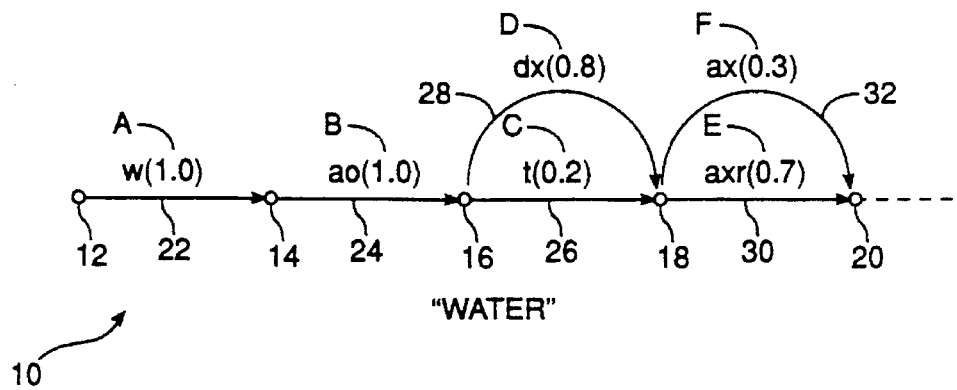
FIG. 1 is a network diagram for a single word representing a set of pronunciations.

Word pronunciations are modeled as directed networks of phones. FIG. 1 represents a directed word network 10 of a state machine used for recognizing a sample word, such as the word "water." Probabilities A, B, C, D, E, F are, according to the invention, associated with the transitions 22, 24, 26, 28, 30, 32 leaving each node 12, 14, 16, 18, 20, specifying the probability of taking each transition upon leaving a node in the directed network. In this example, there are four unique paths through the directed network 10. The path of transitions 22-24-28-30 is the most-likely path based on the probability calculations, which probabilities have been obtained in accordance with the invention. The system according to the invention builds pronunciation networks by replacing each arc in the word pronunciation networks with the corresponding HMM phone network. The probability distributions for transitions and output symbols are estimated during the training phase using labeled examples of speech. The recognition technique comprises determining the path through the Markov chain (the whole directed pronunciation network, as opposed to the word network) that has the highest probability of generating the observed sequence. For continuous speech, this path will correspond to a sequence of word models.

Figure 2:
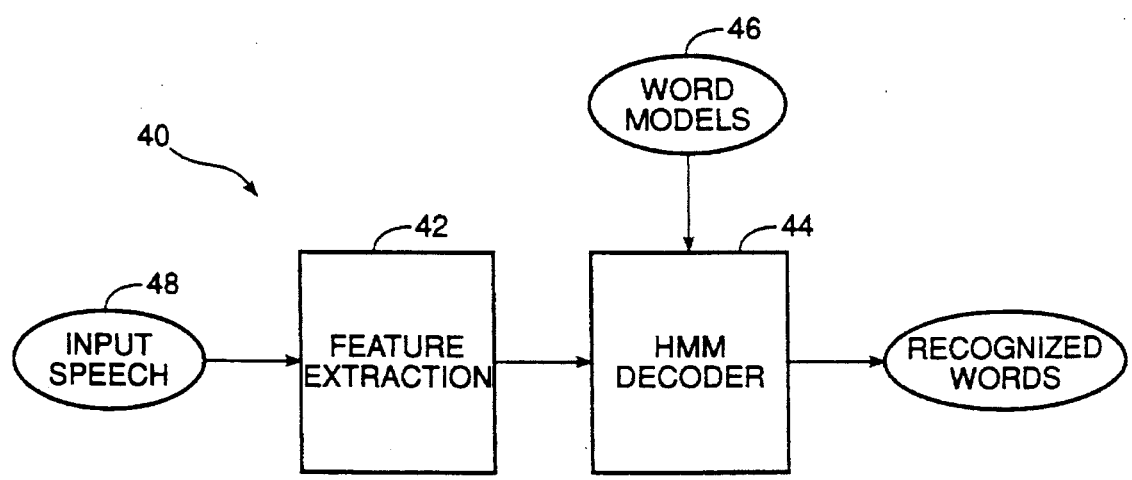
FIG. 2 is a block diagram of a generalized speech recognition system according to the invention.

FIG. 2 is a block diagram of a general embodiment of a speech recognition system 40 according to the invention. The techniques described herein for generating word pronunciation models are applicable to other types of systems as well, including systems which use different feature sets, and non-HMM systems.

The system 40 comprises a feature extraction element 42 coupled to receive input speech, a word model set 46, and a hidden Markov model decoder element 44 coupled to receive feature vectors and to compare the feature vectors with word models from the word model set 46 to produce recognized words. The system 40 models speech as a sequence of feature vectors generated by a Markov source. Therein features are extracted from input speech 48, quantized, and sent to the HMM decoder 44. The decoder 44 finds the sequence of word models from a database of trained word models of the word model set 46 that generates the observed sequence of feature vectors with highest probability. The output is a sequence of words in a machine recognizable form (e.g., ASCII code) of an hypothesized sentence.

The feature extraction element 42 of the system 40 takes speech input and produces a string of feature vectors as output. There are four elements in each feature vector:
[1] a vector quantized, energy normalized, mel-cepstrum;
[2] a vector quantized difference of mel-cepstrum;
[3] a quantized energy from the mel-cepstrum; and
[4] a quantized difference of energy.

The technique for processing speech in this manner is relatively well understood. The input speech is sampled at 16 KHz, and a mel-cepstrum analysis is performed with a window size of 25 ms and frame rate of 100 Hz according to the teachings in Davis 80. The energy feature is derived from the first mel-cepstral coefficient, and the spectral features from the next twelve coefficients. The difference features are derived by smoothing the mel-cepstral and energy features using a three point finite impulse response (FIR) filter and taking the difference four frames apart. Both vector-quantization codebooks contain 256 codewords and are generated using the Lloyd algorithm as found in Gray 84. Energy is quantized into 25 levels, and delta-energy is quantized into 25 levels. A feature vector is output from the feature extraction element 42 for every 10 ms of input speech.

Training the system involves estimating the parameters of the Markov source with the forward-backward algorithm as taught in for example Levinson 83. Each word has its own Markov source. Words are represented as probabilistic networks of HMM phone models, as for example illustrated in FIG. 1, each phone model 10 indicating the possible pronunciations of the words. Since the amount of training data is inadequate to reliably estimate the parameters for many of the words, training data must be shared between words by similar sub-word units. The same phone in different words share training data.

Recognition consists of solving for the state sequence that is most-likely to have generated the input features, given a list of input feature vectors and a set of trained word models. The well known Viterbi algorithm is used to compute the probability of being at a word-final state at a time corresponding to the final input vector. The algorithm provides a backtrace of the most-likely state sequence given the input data. The word sequence corresponding to this state sequence is the recognized sentence.

Figure 3:
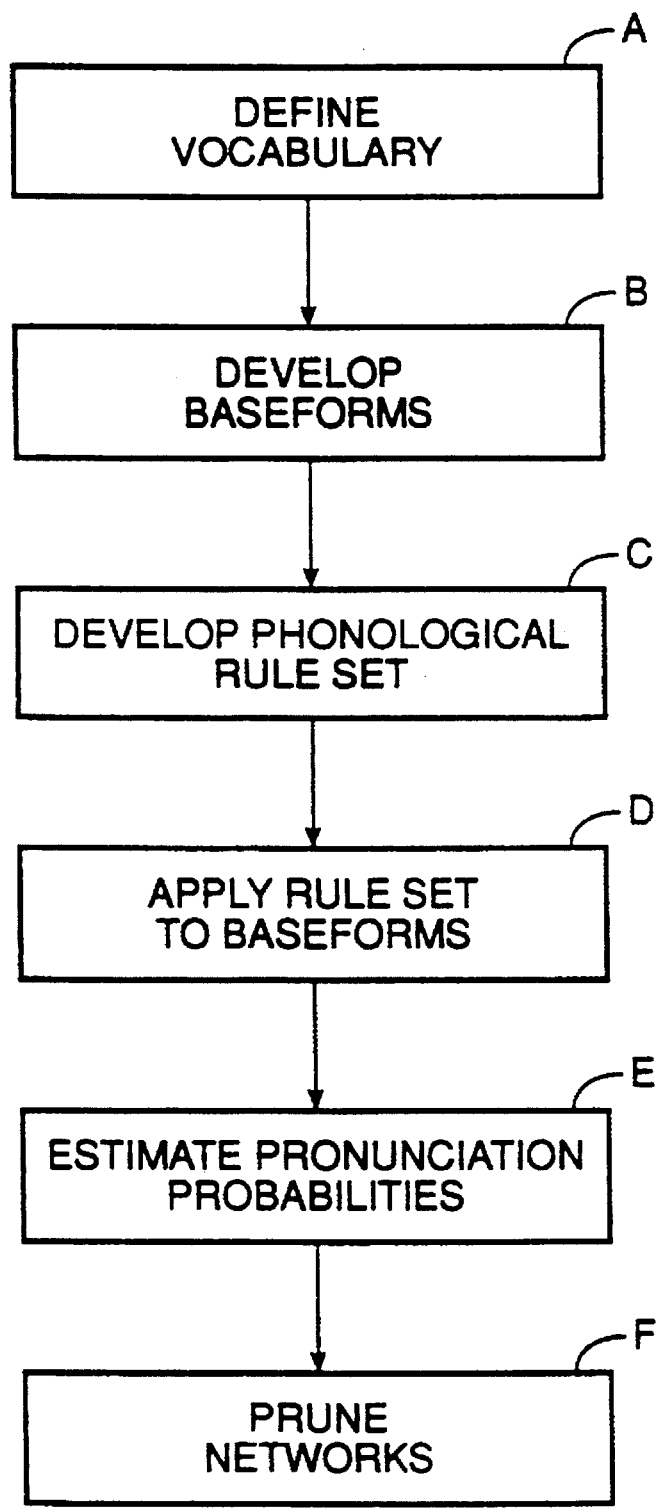
FIG. 3 is a flow diagram of a method for generating a word pronunciation network according to the invention.

According to the invention, the word pronunciation networks are generated using a new technique which results in efficient networks with high coverage of likely pronunciations. The approach to generating these networks is illustrated with reference to FIG. 3. First, a vocabulary must be chosen (Step A). Second, a set of baseforms is developed for the vocabulary items (B). These baseforms can either be specified by hand, or generated automatically. Mechanisms for the automatic generation of baseforms can be derived from available commercially-available speech synthesizers, such as in the PROSE-2000 Speech Synthesizer, available from Centigram Communications Corp. of San Jose, Calif. The automatic generation of baseforms involves the execution of a set of letter-to-sound rules on the orthographic representation of the words. Third, a phonological rule set is developed using a method described herein (Step C). Fourth, the phonological rules are applied to the baseforms, using the approach described herein (Step D). Fifth, pronunciation probabilities are estimated using the approach described herein (Step E). Finally, the networks are pruned, i.e., either single most-likely pronunciations are determined using a technique described herein, or sparse multiple pronunciation networks are generated using a technique described herein (Step F).

The development of the phonological rule set (Step C) will now be described.

A phonological rule set consists of a set of rules defining the possible allophonic realizations of phonetic segments in context. When used in conjunction with a speech recognition system, each word in the vocabulary of the system is typically represented by a baseform pronunciation and a set of phonological rules to be applied to the baseforms for generating the set of pronunciations for each word.

Figure 4:
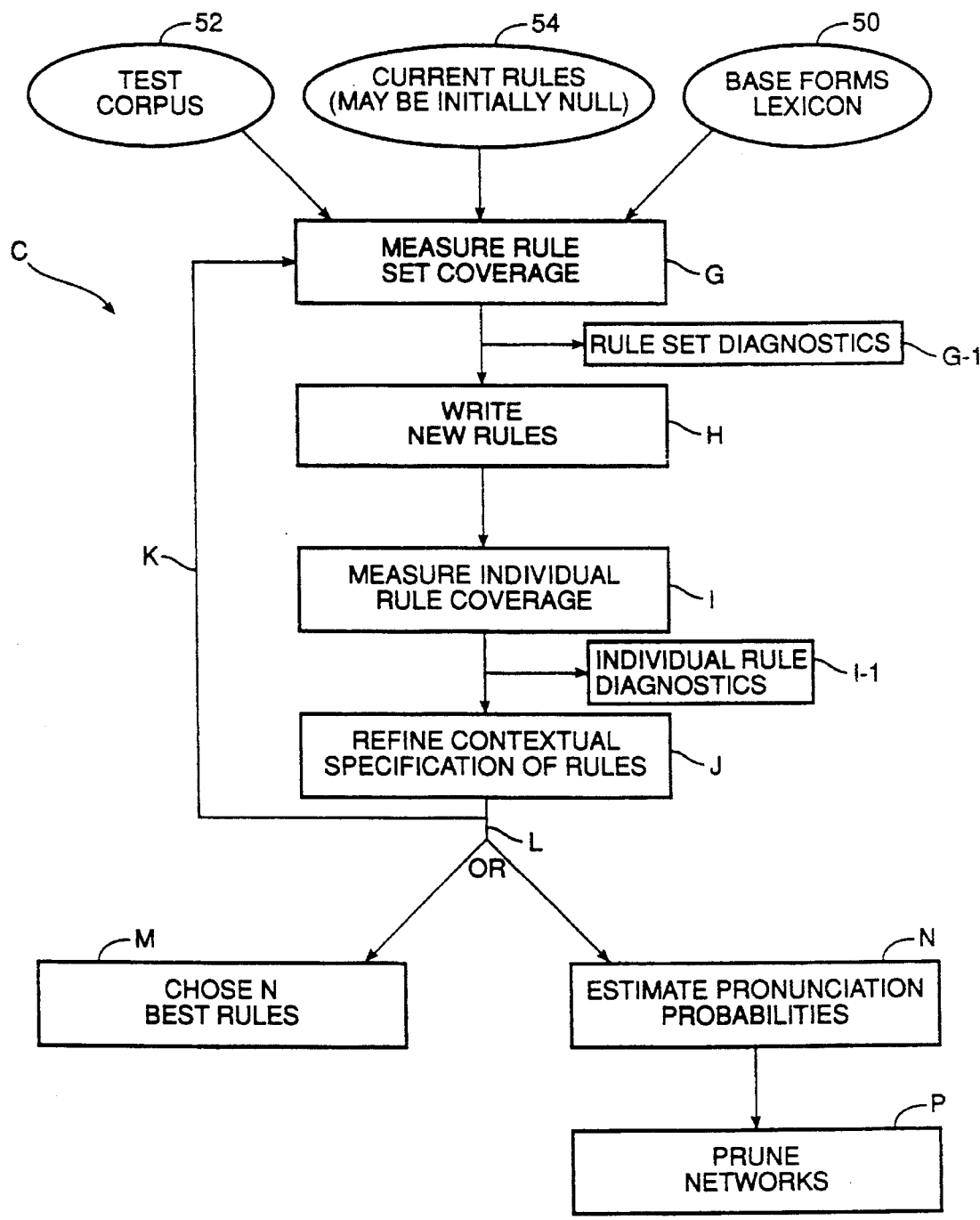
FIG. 4 is a flow diagram of a method for generating a phonological rule set according to the invention.

The method of Step C illustrated in FIG. 4 is used to develop the phonological rule sets according to the invention. The goal of this approach is to minimize the size of the resulting pronunciation networks while maximizing the coverage of input pronunciations, in order to overcome the problems previous approaches have had due to the large number of model parameters that must be estimated with a fixed training set size.

The phonological rules describe variations in the realization of phonetic segments in specified contexts. The actions of rules are to either insert, delete, or substitute phones, sequences of phones, or phonetic features. The contexts within which rules apply can be expressed as a boolean function over phones, distinctive features, and specifications of stress. Any number of neighboring phones can be included in the context. Both intra and inter-word rules can be handled.

The application of rules across words results in frayed edge networks. Such networks are used to represent coarticulatory phenomena between words. These will be described hereinafter.

Referring to FIG. 4, the rules generation method (Step C) makes use of a lexicon 50 of base forms, a test corpus 52 of pronunciations, and (optionally) a phonological rule set 54 (i.e., either start with an existing rule set and refine it, or start with just baseforms). The optional aspect may be implemented by making available the rule set as a null set.

The baseforms in the lexicon 50 represent standard pronunciations of words prior to the application of phonological rules.

The test corpus 52 comprises a phonetic database which may be either a set of hand phonetic transcriptions of spoken sentences or phonetic output from a recognition system.

Both the baseforms of lexicon 50 and the phonetic transcription strings of test corpus 52 are linked to textual representations of the words they represent.

The first step in generating a phonological rule set is to measure the coverage of output forms (either baseforms or, if there already exist some rules, forms resulting from the application of current rules to baseforms) on the pronunciations in the test corpus (Step G). The system, which is typically implementable on a computer workstation with adequate storage capacity for the programs and data, may display diagnostic information on uncovered pronunciations (Step G-1).

The second step is to write rules to cover pronunciations which the system indicates are not currently covered (Step H).

The third step is to measure the coverage and overgeneration of individual rules (Step I). The system may thereafter display diagnostic information on coverage and overgeneration (Step I-1). As a result there may follow the refinement of the contextual specifications of rules (Step J). The purpose of these refinements is to prevent a rule from applying in the cases leading to overgeneration, while allowing the rule to apply in the cases leading to coverage. Lisp code for measuring coverage and overcoverage and for reporting diagnostic information, which are described further below, is provided in Appendix F.

Steps one through four (G-J) are repeated in Loop K until a high coverage rule set is determined to have been achieved at Decision point L. Finally, if necessary, the network size can be reduced by either ranking the rules by probability (for example by the ratio: coverage/(coverage+overgeneration)) and choosing the N best rules (Step M), or by estimating pronunciation probabilities (Step N) for the networks in a system using a method described herein and eliminating low probability arcs (pruning the networks) using another method described herein (Step P).

In order to measure coverage of a data set (corpus of pronunciations) by a set of rules, the path must be found through the pronunciation networks for the data set which minimizes the number of insertions plus deletions plus substitutions of phones. Coverage is computed by the following procedure:

EQ 1

$$\text{coverage} = 1 - (I+D+S)/N$$

where
I=number of insertions
D=number of deletions
S=number of substitutions
N=total number of segments in data set In order to find the path for the data set through the pronunciation network which minimizes the number of insertions, deletions and substitutions, a dynamic programming algorithm is used based on the following recurrence relation:

Let $L$ = lexical network     EQ 2

$L_a$ = the subgraph of $L$ representing all paths which end at arc $a$ $T$ = transcription $T_s$ = transcription prefix ending at segment $s$ $S(L,T)$ = score for the best matching path for transcription $T$ through lexical network $L$ $$S(L,T) = \underset{f = \text{final lex arcs}}{\text{MIN}} [S(L_f,T)]$$

Under stated conditions:

$S(L_a,T_s)$ = 0 if $(a = 0$ and $s = 0)$

{start of lex and trans}

= $1 + S(L_a,T_{s-1})$ if $(a = 0)$

{start of lex}

= $1 + \underset{p = \text{pred lex arcs to } a}{\text{MIN}} [S(L_p,T_s)]$ if $(s = 0)$ {start of trans}

= $\underset{p = \text{pred lex arcs to } a}{\text{MIN}} [S(L_p,T_{s-1})]$ if $(\text{symbol}(L_a) = \text{symbol}(T_s))$ {lex and trans symbols match} otherwise if no match

= 1 + MIN of the following expressions:

$[S(L_a,T_{s-1})]$ or     {deletion error}

$\underset{p = \text{pred lex arcs to } a}{\text{MIN}} [S(L_p,T_s)]$ or     {insertion error}

$\underset{p = \text{pred lex arcs to } a}{\text{MIN}} [S(L_p,T_{s-1})]$

{substitution error}.

By way of explanation; the goal of the recurrence relation described in EQ 2 above is to compute S(L,T), or the distance between the transcription string and its best matching path through the pronunciation network. The recurrence relation defines an algorithm in which the basic step is a comparison of an arc in a pronunciation network to a transcription symbol. If the symbols match, the score is computed as the minimum penalty path (where a penalty of 1 is counted for each insertion, deletion, or substitution error) leading to the previous transcription symbol and any predecessor arc. If the symbols do not match, the score is computed as 1+the minimum penalty path considering the current error as either an insertion, deletion, or substitution error. (i.e., if it is an insertion error, compute the minimum penalty path to a predecessor arc and the current transcription symbol, if it is a deletion error, compute the minimum penalty path to the current arc and the previous transcription symbol, and if it is a substitution error, compute the minimum penalty path to a predecessor arc and the previous transcription symbol.) The necessary initial conditions include returning a score of 0 when at the beginning of the network and the transcription, and a score of i+the minimum penalty path to the preceding symbol or to a predecessor arc, if at the beginning of the network or the transcription, respectively.

The value S(L,T) returned by this algorithm is a count of the number of (insertion plus deletion plus substitution) errors for the best matching path of the transcription string through the pronunciation network (the numerator of EQ 1). This value can be computed once all the scores for the partial paths upon which it depends have been computed. The denominator of EQ 1 is the total number of segments in the data set.

Overgeneration is readily computed. A value of merit for overgeneration is the average number of arcs per sentence that are not in the best path.

A number of phonological rule sets have been developed using the approach described above. The rule set used in the current embodiment of the invention is defined in Appendix A attached hereto and made a part hereof. The speech recognition portion of the invention can be used with any appropriate rule set. In addition, the approach described here for developing phonological rule sets can be used to develop pronunciation models for many types of systems requiring pronunciation models besides the HMM system described herein.

The phonological rule set is applied in the current invention in the context of multiple pronunciations of words represented as networks of phonetic segments wherein the networks are generated by applying phonological rules set forth above to a set of baseform pronunciations of words.

Each phonological rule is allowed to apply at only one time, and at that time it applies everywhere in the network where its context is fulfilled. The order in which rules apply can be specified, and groups of rules can be specified to apply in parallel. It is allowed that words have single or multiple baseforms. Multiple baseforms are useful in cases in which an alternative pronunciation is not the result of a generally applicable phonological process. Lisp computer code of the preferred embodiment, for applying phonological rules to baseforms to determine word networks, is provided in Appendix B.

The algorithm for generating pronunciation networks is as follows:

—For each successive set of parallel rules:

—find all the places where each of the rules can apply to the current set of pronunciation networks;

—apply the rules, generating new paths when necessary;

—make the set of pronunciation networks deterministic by applying Hopcroft and Ullman's (first) algorithm as found in John E. Hopcroft et al., "Introduction to Automata Theory, Languages, and Computation," *Addison-Wesley Publishing, Co.*, (1979), pp. 22–24 (incorporated herein by reference); and —minimize the set of pronunciation networks using Hopcroft and Ullman's (second) algorithm as found in John E. Hopcroft et al., pp. 68–71 (incorporated by reference).

Associated with each arc in a pronunciation network is a record of the rule or rules which applied to bring the arc into existence. This record is needed for the estimation of pronunciation probabilities.

Cross-word coarticulation must be modeled in a fully functional continuous speech recognition system. It is known that there are substantial cross-word effects on pronunciation, both acoustic and phonological. These effects are most extreme at the starts and ends of words, the pronunciation of which may vary substantially depending on the adjacent phonetic segments in neighboring words.

According to the present invention, both acoustic and phonological cross-word coarticulatory effects are explicitly modeled. In the preferred embodiment this modeling is performed by the C language code provided in Appendix G. Frayed edge word pronunciation networks model the cross-word phonological effects. To generate frayed edge word networks, first, phonological rules are designed based on EQ 1 and EQ 2 above which capture cross-word phonological coarticulatory effects. These rules are allowed to apply across words, leading to networks with multiple start and/or end nodes. Any initial arc may have an associated set of constraints on which final arcs of words may connect to it. These constraints may be in the form of boolean combinations of phonetic segments, distinctive features, and specifications of stress. These sets of constraints are automatically determined according to the constraints associated with application of the rules which created the arc in question. Final arcs of words are handled in a similar manner. During execution of the training and recognition algorithms, the constraints determine which end-arcs can connect to which start-arcs.

Acoustic cross-word effects are modeled by the addition of extra start and end arcs to pronunciation networks which also have constraints on what previous or following arcs they can connect to. The addition of acoustic cross-word arcs is limited to initial and final phones which have a sufficient number of training samples to estimate additional acoustic parameters reliably. The algorithm for modeling cross-word effects is as follows:

For every word network w:

For every initial (final) arc $a_i$: Let $P_i$=phone label on arc $a_i$. And then for every phone label $p_j$ in the phonetic inventory:

Count the number of occurrences c in the training database of the word w preceded (or followed) by a word ending (beginning) with the phone $p_j$;

if c>threshold, then i) add an initial (final) arc $a_k$ to word w with the phone label $P_i$ which connects to the same to-node as arc $a_i$;

ii) constrain arc $a_k$ to only connect to arcs with label $p_j$; and iii) constrain arc $a_i$ not to connect to arcs with phone label $p_j$.

Figures 5, 6:
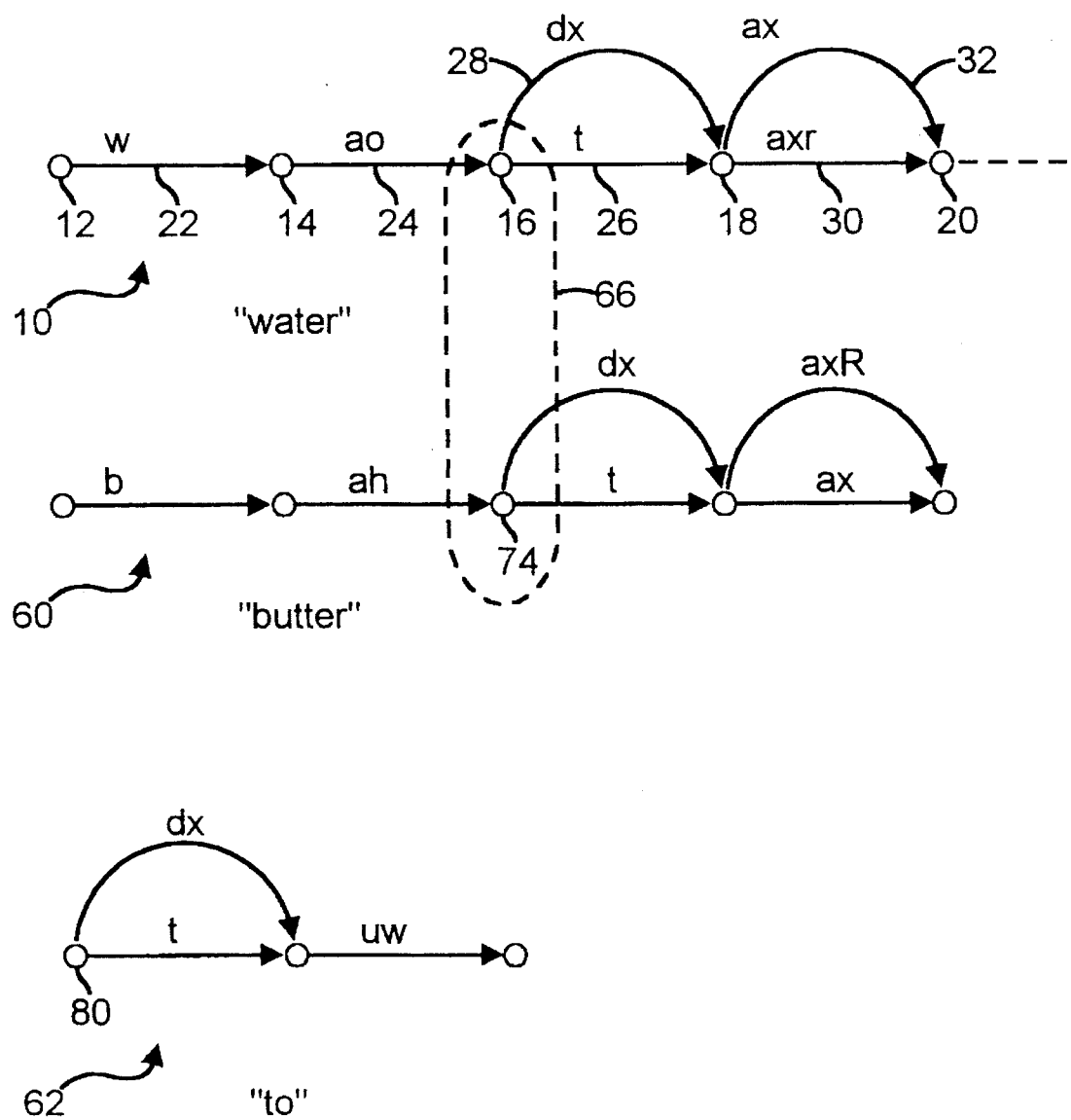
FIG. 5 shows network diagrams for three words representing a set of pronunciations and shows an equivalence class.
FIG. 6 illustrates a phonological rule.

In a system according to the invention it is important to estimate pronunciation probabilities. It has been shown that there are substantial differences in the probabilities of the various pronunciations of words. In order to minimize the increase in false alarm rates based on multiple pronunciations, the current invention employs a new method to obtain reliable estimates of pronunciation probabilities, based on sharing training samples between sub-word units. C language computer code implementing this method is provided in Appendix C. FIG. 5 illustrates this, showing three network diagrams of three words in order to show sharing training samples. FIG. 5 repeats the network diagram 10 for the word "water" of FIG. 1 omitting the estimated pronunciation probabilities. FIG. 5 also shows similar networks for "butter" 60 and for "to" 62.

According to the inventive method, to estimate pronunciation probabilities, the set of nodes in the networks for the entire vocabulary are divided into what are called equivalence classes, such as 66. All nodes in the same equivalence class, such as 16 and 74 share training samples for estimating pronunciation probabilities (i.e., the probability of taking each of the outgoing arcs when visiting the node).

Ideally, to determine equivalence classes, it is desirable to know, for each allophonic choice (i.e., for each node in the word pronunciation networks), how much of the surrounding context plays an important role in determining the pronunciation at that point. If none of the context matters, that node can be placed in the same equivalence class with all similar nodes (i.e., nodes representing a similar allophonic choice), while if some aspect of the context does play an important role in determining allophonic choice at that node, the node should only be placed in a class with similar nodes sharing the relevant contextual constraints. For example, node 80 in "to" is not placed in equivalence class 66 because the rules or contextual constraints of 80 are not shared with 74 and 16.

In the current invention, nodes are placed in the same equivalence class if and only if both of the following conditions hold:

[1] There is a one-to-one correspondence between labels (of phones) on outgoing arcs, such as "dx" and "t" at nodes 16, 74, and 80.

[2] There is a one-to-one correspondence between the sets of rules responsible for bringing each of those arcs into existence, such as nodes 16 and 74.

This set of conditions assures that similar sub-word units with similar contextual constraints share training samples. When there are relevant contextual constraints, arcs leaving the node will depend on rules which apply in that context. When the next symbol is not conditioned by the context, there will not be any rules on arcs leaving the node which depend on that context.

FIG. 6 illustrates one phonological rule, showing that [t] may be pronounced as [dx] in the context of an unstressed vowel. The phonological rule depicted in FIG. 6 is also presented on page A-7 of the appendix labeled "t to d 1: latter."

The estimation of pronunciation probabilities using these equivalence classes is incorporated into the forward-backward algorithm described in Levinson 83, incorporated herein by reference, which is used to train the phonetic models. Hidden Markov models of words are generated by replacing the arcs in word pronunciation networks with hidden Markov models of phones. The forward-backward algorithm provides estimated counts of traversals of each transition for each training sample. Transitions into initial nodes of HMM phone models correspond to arcs in word pronunciation networks. These counts are used for estimating the probabilities of each of the outgoing arcs from each node in the word pronunciation networks after combining the counts for nodes in the same equivalence class. At the end of each iteration of the forward-backward algorithm, the probability of each arc in each equivalence class is estimated as:

$$P_{i,j} = \frac{\sum_{k=\text{nodes in class } j} C_{i,k}}{\sum_{l=\text{arcs in class } j} \sum_{k=\text{nodes in class } j} C_{l,k}} \quad \text{EQ 3}$$

where
$P_{i,j}$=estimated probability for arc i in equivalence class j;
$C_{i,k}$=forward-backward count for arc i leaving node k.

Once pronunciation probabilities have been estimated for the word networks using the method outlined hereinabove, low probability arcs may and preferably should be eliminated by pruning. A pruning algorithm according to the invention eliminates low probability arcs while insuring that there are no disconnected components (i.e., sections of the word network that cannot possibly be reached), that there is at least one complete path from beginning to end through the word network with no start or end constraints, and that there are no incomplete paths (e.g., paths that can start but which never reach an end). C language computer code of the preferred embodiment for performing this pruning is provided in Appendix E. The pruning algorithm according to the invention is as follows:

—For each word network:

—find the single most-likely path through the network which begins with an arc that has no constraints on which (word-final) arcs can precede it, and ends with an arc that has no constraints on which (word-initial) arcs can follow it and mark all such arcs as UNDELETABLE;

—delete all arcs with probability less than a threshold unless it is marked UNDELETABLE;

—using a depth-first search of the word network, starting from each possible start arc, mark all arcs reached as START-VISITED;

—using a depth-first backward search of the word network, starting from each possible end arc, mark all arcs reached as END-VISITED; and —delete all arcs not marked both START-VISITED and END-VISITED.

In certain applications of speech recognition according to the invention, it may suffice to use only the single most-likely pronunciation for each word, rather than a network representing multiple pronunciations. C language computer code for determining single most-likely pronunciations is provided in Appendix D. In accordance with the invention, it is possible to determine the single most-likely pronunciation for each word by the following algorithm:

—Generate word networks using a rule set developed by the inventive method;

—Estimate pronunciation probabilities according to the inventive method; then

—For each word network:

—eliminate all start and end constraints from arcs; and thereafter

—choose the most-likely next arc for each node along the most-likely path by starting from the most-likely start arc, and testing at each node for the most-likely next arc.

In some embodiments of the invention, the system is preferably speaker-dependent. In such cases, all the training data is taken from a single speaker, who is the intended user of the system, to generate speaker-dependent pronunciation networks, thereby capturing the speaker-specific pronunciations.

The algorithm for generating speaker-specific networks is as follows:

—Generate a set of word networks using a rule set derived as described hereinabove;

—Train the pronunciation probabilities of the word networks using the node equivalence class training algorithm described hereinabove;

—Derive either a set of speaker-specific multiple pronunciation networks using the network pruning algorithm described hereinabove or a set of speaker-specific single pronunciation networks using the algorithm described hereinabove.

A disclosure of a specific implementation of methods according to the invention are attached hereto as Appendices B through G as source code listings incorporating algorithms described herein.

The invention has now been explained with reference to specific embodiments. Other embodiments will be apparent to those of ordinary skill in the relevant art in view of this disclosure. Therefore, it is not intended that this invention be limited, except as indicated by the appended claims.

What is claimed is:

1. A method for estimating pronunciation probabilities in word pronunciation networks that incorporate dialectal variations in pronunciation for use in a speech recognition system wherein said word networks comprise a plurality of nodes, each node connected to its successive node by one or more arcs, each arc having associated with it a phone and a numerical variable for storing the pronunciation probability that arc is taken comprising the steps of:

determining equivalence classes for a plurality of nodes in the word pronunciation networks by:

if context with surrounding nodes is not relevant phone choice at a node, classifying that node with nodes having similar phone choices into the same equivalence class; and if context with surrounding nodes is important in determining phone choice at a node, classifying that node in an equivalence class with similar nodes having similar phone choices and sharing identical relevant contextual constraints, such that all nodes in the same equivalence class may share training samples for estimating pronunciation probabilities; and using a set of training samples to estimate the pronunciation probabilities in the word pronunciation network such that training samples for a given word will contribute to the training of networks for all other words that have any nodes in an equivalence class with any of the nodes of that word.

2. The method according to claim 1, wherein said arcs in said word networks are brought into existence by applying a set of phonological rules to a set of baseform word models and wherein context with surrounding nodes is considered important and nodes are placed in the same equivalence class if and only if there is a one-to-one correspondence between phones of outgoing arcs; and there is a one-to-one correspondence between sets of phonological rules responsible for bringing each of said outgoing arcs into existence.

3. The method according to claim 1, further comprising the steps of:

replacing arcs in said word pronunciation networks with hidden Markov models of phones;

estimating counts of traversals of each transition of a forward-backward algorithm for each training sample, wherein transitions into initial nodes of hidden Markov model phone models correspond to arcs in word pronunciation networks; and after combining counts for nodes in equivalence classes, employing said combined counts for estimating probabilities of each of the outgoing arcs from each node in the word pronunciation networks.

4. The method according to claim 3, wherein said estimating step is given by:

$$P_{i,j} = \frac{\sum_{k=\text{nodes in class } j} C_{i,k}}{\sum_{l=\text{arcs in class } j} \sum_{k=\text{nodes in class } j} C_{l,k}}$$

where $P_{i,j}$=estimated probability for arc i in equivalence class j;
$C_{i,k}$=forward-backward count for arc i leaving node k.

5. A method for building word pronunciation networks that incorporate dialectal variations in pronunciation useful for recognizing speech by a data processing computer comprising the steps of:

acquiring a set of baseform word models for each of the words in the vocabulary to be recognized;

acquiring a set of phonological rules that define allowed pronunciation variations, at least one of said phonological rules specifying allophonic choices allowed in a particular context;

applying the phonological rules to the baseform word models to obtain a set of word models that incorporate dialectal variations in pronunciation; and determining equivalence classes, each equivalence class being a grouping of nodes within said word models that incorporate dialectal variations in pronunciation wherein each node in an equivalence class represents the same possible pronunciation variations governed by the same phonological rules.

6. The method according to claim 5 further comprising using a set of training samples to estimate the probabilities of the pronunciation variations in the word models that incorporate dialectal variations in pronunciation and sharing said probabilities among nodes in the same equivalence class such that training samples for a given word will contribute to the training of the models for other words that have a node in an equivalence class in common with the node of that given word.

7. The method according to claim 5 wherein the baseform word models are generated automatically by executing a set of letter to sound rules on the alphabetic representation of the words.

\* \* \* \* \*